United States Patent Office 3,297,569
Patented Jan. 10, 1967

3,297,569
METHOD AND COMPOSITION FOR FREEING STUCK DRILL PIPE
James L. Lummus, Tulsa, Okla., assignor to Pan American Petroleum Corporation, Tulsa, Okla., a corporation of Delaware
No Drawing. Filed Dec. 10, 1963, Ser. No. 329,403
8 Claims. (Cl. 252—8.5)

This invention relates to drilling wells. More particularly, it relates to preventing sticking of drill pipe to the well wall or to releasing the drill pipe after it is stuck.

In well drilling operations, the drilling fluid circulated in a well often developes a hydrostatic pressure in excess of the pressure in the formations being drilled. In such cases, if a portion of the drill pipe becomes embedded in the filter cake on a well wall, the differential pressure between fluids in the well and in the formation presses the drill pipe against the well wall with such force that it is difficult to disengage the pipe from the well wall.

This problem, together with methods and compositions for overcoming it, is described in more detail in U.S. Patent 3,223,622. The application also discloses several surface-active agents which have been found to be superior for preventing sticking of the drill pipe or in freeing it if it becomes stuck. Among these agents one which has proved to be very successful in field operations is the one prepared from about 4 parts of a half ammonium half isopropylamine salt of the sulfosuccinic acid ester of the oleic acid amide of isopropanol amine and about 1 part of the isopropylamine salt of dodecyl benzene sulfonic acid. Further particulars on the preparation of this latter compound are disclosed in U.S. 2,976,209. This is generally referred to hereinafter as complex amine sulfonate.

In many operations this agent has been used without difficulty. Some objection has been raised, however, to use of the agent in muds heavily weighted with barite and containing oil. In these, the complex amine sulfonate appears to cause the barite to become coated with oil. The oil coatings tend to cause the barite particles to stick together in large clusters. The result is a ropy appearance of the drilling fluid, although the properties remain satisfactory. In some cases the agglomerates of barite particles settle out of the drilling fluid and are lost.

An object of this invention is to provide a method for preventing the agglomeration of barite particles in the presence of oil and the complex amine sulfonate. Another object is to provide a highly weighted drilling fluid, including the complex amine sulfonate and oil, in which drilling fluid the barite partcles do not stick together and do not tend to settle out of the drilling fluid.

In general, I accomplish the objects of my invention by treating the drilling fluid with certain vinyl-maleic copolymers or acrylic acid-acrylamide copolymers before the complex amine sulfonate is added and, preferably, before oil is added to the drilling fluid.

The vinyl-maleic copolymers are of the type described in more detail in U.S. Patent 3,070,543, Scott. Preferably, they are water soluble copolymers of vinyl acetate and maleic anhydride containing from about 1 to about 1.5 times as many vinyl radicals as maleic radicals and being polymerized to such a degree that a 0.4 percent by weight aqueous solution has a viscosity between about 1 and about 3 centipoises at 25° C.

The acrylic acid-acrylamide copolymer is a water soluble copolymer having an acrylic acid to acrylamide molar ratio of between about 30 to 70 and about 70 to 30, and being polymerized to such a degree that a 1 percent by weight aqueous solution has a viscosity of from about 2,000 to about 20,000 centipoises at 20° C.

The concentration of either copolymer should be between about 0.01 and about 0.5 pound per barrel of drilling fluid, and preferably from about 0.05 to about 0.1 pound per barrel. The concentration of the complex amine sulfonate can then be from about 0.2 to about 25 pounds per barrel of drilling fluid, and preferably from about 2 to about 10 pounds per barrel.

I believe the copolymers perform their function by forming a coating on the surfaces of the barite particles, thus preventing these particles from being made oil wet by the complex amine sulfonate. I do not, of course, wish to be limited to this theory, however.

The actions of the various materials can be observed in a simple laboratory test. This test is as follows:
(1) Add 72 cc. of water to a 100 cc. graduated cylinder.
(2) Add 25 grams of barite and disperse by shaking.
(3) Add 1 cc. of a 1 percent coplyomer solution; disperse by shaking.
(4) Add 10 cc. of diesel oil and disperse by shaking.
(5) Add 1 cc. complex amine sulfonate. Disperse by moving cylinder up and down rapidly approximately 10 times.

In this test if the polymer performs its proper function, the barite will remain finely divided and will settle slowly to the bottom of the cylinder. If the polymer does not perform its function, the barite particles will collect together into aggregates, which fall rapidly to the bottom of the cylinder. For comparison, a test should be made following the same steps, but omitting the copolymer.

Two polymers were tested in the laboratory and will serve as examples of the function of these materials. One copolymer was the reaction product of vinyl acetate and maleic anhydride containing approximately equal quantities of the two reactants. The other polymer was the reaction product of substantially equal mols of acrylic acid and acrylamide. The polymerization was carried to such an extent that a 1 percent solution of the copolymer had a viscosity of about 15,000 centipoises at about 25° C. In both cases the barite remained finely divided in the presence of the complex amine sulfonate. In the absence of the copolymers, the barite agglomerated into large clusters which had an almost liquid consistency due to the presence of large amounts of oil. These agglomerates fell rapidly to the bottom of the graduated cylinder and formed a separate phase.

My invention will be better understood by reference to the following example: A deep well was being drilled in southern Louisiana. High pressures were anticipated so the drilling fluid was highly weighted. Oil was added to improve the lubricating qualities of the drilling fluid and reduce the fluid loss. There had been some difficulty with stuck drill pipe in this area so some of the complex amine sulfonate was added. After circulation through the well, the mud had an unusual ropy, jelly-like appearance. The mud properties were checked and found to be satisfactory, in spite of the odd appearance, so drilling was continued with the drilling fluid, although there was some tendency of the barite to settle out of the mud.

In a nearby well the drilling fluid was first treated with the vinyl acetate maleic anhydride coploymer described above in connection with the laboratory test. When oil and the complex amine sulfonate were added to this drilling fluid as drilling approached the zone in which stuck drill pipe usually occurred, there was no noticeable change in the drilling fluid appearance. The complex amine sulfonate performed its usual function of improving drilling fluid properties. There was no increased tendency for barite to settle out of the drilling fluid.

The viscosity of the vinyl-maleic copolymer is to be measured by an Ostwalt viscosimeter. The viscosity of the acrylate-acrylamide copolymer is to be measured by a Brookfield viscosimeter rotating at 6 revolutions per minute using a number 2 spindle for viscosities below 5000, a number 3 spindle for viscosities between 5000 and 20,000, and a number 4 spindle for viscosities over 20,000.

I claim:

1. A method for treating an aqueous base drilling fluid having a continuous aqueous phase and containing barite to decrease sticking of the drill pipe to the well wall comprising mixing into said drilling fluid a copolymer selected from the group consisting of a water-soluble vinyl-maleic copolymer containing from about 1 to about 1.5 times as many vinyl radicals as maleic radicals and being polymerized to a degree such that a 0.4 percent by weight aqueous solution has a viscosity of between about 1 and about 3 centipoises at 25° C. and a water-soluble acrylic acid-acrylamide copolymer having an acrylic acid to acrylamide molar ratio of between about 30 to 70 and about 70 to 30 and being polymerized to such a degree that a 1 percent by weight aqueous solution has a viscosity of from about 2,000 to about 20,000 centipoises at 20° C., the concentration of said copolymer being between about 0.01 and about 0.1 pound per barrel of said drilling fluid, mixing oil into said drilling fluid, and then mixing into said drilling fluid a complex amine sulfonate prepared from about 4 parts of a half ammonium half isopropylamine salt of the sulfosuccinic acid ester of the oleic acid amide of isopropanol amine and about 1 part of the isopropylamine salt of dodecyl benzene sulfonic acid, the concentration of said sulfonate being from about .2 to about 25 pounds per barrel of drilling fluid.

2. The method of claim 1 in which said copolymer is prepared from substantially equal numbers of mols of vinyl acetate and maleic anhydride, the concentration of said copolymer is within the range from about 0.05 to about 0.1 pound per barrel, and in which the concentration of said sulfonate is within the range from about 2 to about 10 pounds per barrel.

3. The method of claim 1 in which said copolymer contains substantially equal mols of acrylic acid and acrylamide, the polymerization is carried to such an extent that the viscosity of a 1 percent aqueous solution of 20° C. is about 15,000 centipoises, the concentration of said copolymer is from about 0.05 to about 0.1 pound per barrel, and the concentration of said sulfonate is from about 2 to about 10 pounds per barrel.

4. The method of claim 1 in which said oil is mixed into said drilling fluid after mixing said copolymer into said drilling fluid.

5. An aqueous base drilling fluid having a continuous aqueous phase and having a decreased tendency to permit stuck drill pipe comprising water, oil, clay, barite, from about 0.01 to about 0.1 pound per barrel of said drilling fluid of a copolymer and from about 0.2 to about 25 pounds per barrel of said drilling fluid of a complex amine sulfonate, said copolymer being added to the water, clay, and barite before said sulfonate, said copolymer being selected from the group consisting of a water-soluble vinyl-maleic copolymer containing from about 1 to about 1.5 times as many vinyl radicals as maleic radicals and being polymerized to a degree such that a 0.4 percent by weight aqueous solution has a viscosity of between about 1 and about 3 centipoises at 25° C., and a water-soluble acrylic acid-acrylamide copolymer having an acrylic acid to acrylamide ratio of between about 30 to 70 and 70 to 30 and being polymerized to such a degree that a 1 percent by weight aqueous solution has a viscosity of from about 2,000 to about 20,000 centipoises at 20° C., and said complex amine sulfonate being prepared from about 4 parts of a half ammonium half isopropyl-amine salt of the sulfosuccinic acid ester of the oleic acid amide of isopropanol amine and about 1 part of the isopropylamine salt of dedecyl benzene sulfonic acid.

6. The drilling fluid of claim 5 in which said copolymer is prepared from substantially equal numbers of mols of vinyl acetate and maleic anhydride, the concentration of said copolymer is within the range from about 0.05 to about 0.1 pound per barrel, and in which the concentration of said sulfonate is within the range from about 2 to about 10 pounds per barrel.

7. The drilling fluid of claim 5 in which said copolymer contains substantially equal mols of acrylic acid and acrylamide, the polymerization is carried to such an extent that the viscosity of a 1 percent aqueous solution at 20° C. is about 15,000 centipoises, the concentration of said copolymer is from about 0.05 to about 0.1 pound per barrel, and the concentration of said sulfonate is from about 2 to about 10 pounds per barrel.

8. A method of preparing an aqueous base drilling fluid having a continuous aqueous phase comprising mixing together water, clay, and barite, dispersing into said mixture a copolymer selected from the group consisting of a water-soluble vinyl-maleic copolymer containing from about 1 to about 1.5 times as many vinyl radicals as maleic radicals and being polymerized to a degree such that a 0.4 percent by weight aqueous solution has a viscosity of between about 1 and about 3 centipoises at 25° C., and a water-soluble acrylic acid-acrylamide copolymer having an acrylic acid to acrylamide ratio of between about 30 to 70 and about 70 to 30 and being polymerized to such a degree that a 1 percent by weight aqueous solution has a viscosity of from about 2,000 to about 20,000 centipoises at 20° C., the concentration of said copolymer being between about 0.01 and about 0.1 pound per barrel of said drilling fluid, adding a hydrocarbon oil to the mixture and completing the preparation of said drilling fluid by dispersing therein a complex amine sulfonate prepared from about 4 parts of a half ammonium half isopropylamine salt of the sulfosuccinic acid ester of the oleic acid amide of isopropanol amine and about 1 part of the isopropylamine salt of dodecyl benzene sulfonic acid, the concentration of said sulfonate being from about 0.2 to about 25 pounds per barrel of drilling fluid.

References Cited by the Examiner

UNITED STATES PATENTS

| | | |
|---|---|---|
| 2,775,557 | 12/1956 | Morgan. |
| 3,070,543 | 12/1962 | Scott. |
| 3,223,622 | 12/1965 | Lummus et al. |

FOREIGN PATENTS

| | | |
|---|---|---|
| 535,786 | 1/1957 | Canada. |
| 639,813 | 4/1957 | Canada. |
| 725,460 | 3/1955 | Great Britain. |

OTHER REFERENCES

Warren-Causes, Preventions Recovery of Stuck Drill Pipe—article in the Oil and Gas Journal—April 4, 1960—pp. 39 and 40.

LEON D. ROSDOL, Primary Examiner.

ALBERT T. MEYERS, SAMUEL H. BLECH, Examiners.

H. B. GUYNN, Assistant Examiner.